United States Patent [19]
Bialick et al.

[11] Patent Number: 6,003,135
[45] Date of Patent: *Dec. 14, 1999

[54] MODULAR SECURITY DEVICE

[75] Inventors: William P. Bialick, Clarksville, Md.; Mark J. Sutherland, Milpitas, Calif.; Janet L. Dolphin-Peterson, Belvedere, Calif.; Thomas K. Rowland, Los Gatos, Calif.; Kirk W. Skeba, Fremont, Calif.; Russell D. Housley, Herndon, Va.

[73] Assignee: Spyrus, Inc., Santa Clara, Calif.

[ * ] Notice: This patent is subject to a terminal disclaimer.

[21] Appl. No.: 08/869,120

[22] Filed: Jun. 4, 1997

[51] Int. Cl.⁶ .................................................. G06F 12/14
[52] U.S. Cl. ............................................................ 713/201
[58] Field of Search .................................... 395/186, 800, 395/188.01; 380/26, 4, 23, 25, 30, 49, 50; 235/492; 713/200, 201, 202

[56] References Cited

U.S. PATENT DOCUMENTS

| | | | |
|---|---|---|---|
| 4,709,136 | 11/1987 | Watanabe | 235/379 |
| 4,910,776 | 3/1990 | Dyke | 380/25 |
| 5,191,611 | 3/1993 | Lang | 380/25 |
| 5,282,247 | 1/1994 | Mclean et al. | 380/4 |
| 5,297,206 | 3/1994 | Orton | 380/30 |
| 5,442,704 | 8/1995 | Holtey | 380/23 |
| 5,457,590 | 10/1995 | Barrett et al. | 360/133 |
| 5,473,692 | 12/1995 | Davis | 380/25 |
| 5,491,827 | 2/1996 | Holtey | 395/800 |
| 5,524,134 | 6/1996 | Gustafson et al. | 380/9 |
| 5,537,544 | 7/1996 | Morisawa | 395/188.01 |
| 5,546,463 | 8/1996 | Caputo et al. | 380/26 |
| 5,548,721 | 8/1996 | Denslow | 395/187.01 |
| 5,610,981 | 3/1997 | Mooney et al. | 380/25 |
| 5,630,174 | 5/1997 | Stone, III et al. | 395/883 |
| 5,640,302 | 6/1997 | Klkinis | 361/687 |
| 5,694,335 | 12/1997 | Hollenberg | 364/514 |
| 5,742,683 | 4/1998 | Lee et al. | 380/23 |
| 5,770,849 | 6/1998 | Novis et al. | 235/492 |
| 5,790,674 | 8/1998 | Houvener et al. | 380/23 |
| 5,828,832 | 10/1998 | Holden et al. | 713/201 |
| 5,878,142 | 3/1999 | Caputo et al. | 380/25 |

FOREIGN PATENT DOCUMENTS

WO 82/03286  9/1982  WIPO .
WO 97/29416  8/1997  WIPO .

OTHER PUBLICATIONS

U.S. application No. 08/869,305, Bialick et al., filed Jun. 4, 1997.

*Primary Examiner*—Joseph E. Palys
*Assistant Examiner*—Rijue Mai
*Attorney, Agent, or Firm*—David R. Graham

[57] ABSTRACT

The invention enables a modular, typically portable, device to communicate with a host computing device to enable one or more security operations to be performed by the modular device on data stored within the host computing device, data provided from the host computing device to the modular device (which can then be, for example, stored in the modular device or transmitted to yet another device), or data retrieved by the host computing device from the modular device (e.g., data that has been stored in the modular device, transmitted to the modular device from another device or input to the modular device by a person). In particular, the modular device can include a security module that is adapted to enable performance of one or more security operations on data, and a target module that is adapted to enable a defined interaction with a host computing device. The target module can be embodied by any of a variety of modules having different types of functionality (e.g., data storage, data communication, data input and output, user identification). The modular device can also be implemented so that the security operations are performed in-line, i.e., the security operations are performed between the interface of the host computing device to the modular device and the external communications interface of the target module. Moreover, the modular device can be implemented so that the security functionality of the modular device is transparent to the host computing device.

58 Claims, 10 Drawing Sheets

| FIG. 7A |
| FIG. 7B |

MODULAR SECURITY DEVICE

CROSS-REFERENCE TO RELATED APPLICATION

This application is related to the commonly owned, copending U.S. patent application entitled "Peripheral Device With Integrated Security Functionality," by William P. Bialick, Mark J. Sutherland, Janet L. Dolphin-Peterson, Thomas K. Rowland, Kirk W. Skeba and Russell D. Housley, filed on the same date as the present application and having Ser. No. 08/869,305, the disclosure of which is incorporated by reference herein.

BACKGROUND OF THE INVENTION

1. Field of the Invention

This invention relates to a modular, typically portable, device (as well as the methods employed by such a modular device, and systems including such a modular device and a host computing device with which the modular device communicates) that can communicate with a host computing device to enable one or more security operations to be performed by the modular device on data stored within the host computing device, data provided from the host computing device to the modular device, or data retrieved by the host computing device from the modular device.

2. Related Art

Computing capability is becoming increasingly portable. In particular, there are more and more portable peripheral devices that are adapted for communication with a host computing device (e.g., desktop computer, notebook computer or personal digital assistant) to enable particular functionality to be achieved. These portable peripheral devices can take a variety of physical forms (e.g., PCMCIA cards, smart cards, CD-ROMs) and can perform an assortment of functions (e.g., storage, communications and cryptography).

However, while portable computing affords a number of advantages, it has a significant disadvantage in that the computational environment (including the portable peripheral devices, the host computing devices in which they are used, and any other computational devices that communicate with those devices) is more susceptible to security breaches, i.e., unauthorized access to, or modification of, programs and/or data resident within the environment. Consequently, cryptographic devices and methods have been developed for use with such computational environments (as well as other computational environments) to enable increased levels of environment security to be obtained.

FIG. 1 is a block diagram of a prior art system for enabling a host computing device to provide secured data to, and retrieve secured data from, a portable device. In FIG. 1, a system 100 includes a host computing device 101 and a portable device 102. The host computing device 101 and portable device 102 are adapted to enable communication between the devices 101 and 102. The host computing device 101 includes a security mechanism 101a (which can be embodied by appropriately configured hardware, software and/or firmware, such as, for example, a general purpose microprocessor operating in accordance with instructions of one or more computer programs stored in a data storage device such as a hard disk) which can be directed to perform one or more cryptographic operations.

In the system 100, if it is desired to provide secured data from the host computing device 101 to the portable device 102, the host computing device 101 causes the security mechanism 101a to perform appropriate cryptographic operations on data before the data is transferred to the portable device 102. Similarly, the host computing device 101 can receive secured data from the portable device 102 and perform appropriate cryptographic operations on the data to convert the data into a form that enables the data to be accessed and/or modified by a person who is authorized to do so.

A significant deficiency of the system 100 is that the security mechanism 101a is itself typically not adequately secure. It is commonly accepted that the components (including hardware, software and/or firmware) of most host computing devices are inherently insecure. This is because the system design of host computing devices is, typically, intentionally made open so that components made by different manufacturers can work together seamlessly. Thus, an unauthorized person may obtain knowledge of the operation of the security mechanism 101a (e.g., identify a cryptographic key), thereby enabling that person to gain access to, and/or modify, the (thought to be secured) data.

FIG. 2 is a block diagram of another prior art system for enabling a host computing device to provide secured data to, and retrieve secured data from, a portable device. In FIG. 2, a system 200 includes a host computing device 201, a portable device 202 and a security device 203. The host computing device 201, the portable device 202 and security device 203 are adapted to enable communication between the devices 201 and 202, and between the devices 201 and 203. The security device 203 includes appropriately configured hardware, software and/or firmware which can be directed to perform one or more cryptographic operations.

In the system 200, if it is desired to provide secured data from the host computing device 201 to the portable device 202, the host computing device 201 first causes data to be transferred to the security device 203, where appropriate cryptographic operations are performed on the data. The secured data is then transferred back to the host computing device 201, which, in turn, transfers the secured data to the portable device 202. Similarly, the host computing device 201 can receive secured data from the portable device 202 by, upon receipt of secured data, transferring the secured data to the security device 203, which performs appropriate cryptographic operations on the data to convert the data into a form that enables the data to be accessed and/or modified by a person who is authorized to do so, then transfers the unsecured data back to the host computing device 201.

The system 200 can overcome the problem with the system 100 identified above. The security device 203 can be constructed so that the cryptographic functionality of the device 203 can itself be made secure. (Such a security device is often referred to as a security "token.") An unauthorized person can therefore be prevented (or, at least, significantly deterred) from obtaining knowledge of the operation of the security device 203, thereby preventing (or significantly deterring) that person from gaining access to, and/or modifying, the secured data.

However, the system 200 may still not always ensure adequately secured data. In particular, unsecured data may be provided by the host computing device 201 to the portable device 202 if the host computing device 201—whether through inadvertent error or deliberate attack by a user of the host computing device 201, or through malfunction of the host computing device 201—fails to first transfer data to the security device 203 for appropriate cryptographic treatment before providing the data to the portable device 202.

Additionally, the system 200 requires the use of two separate peripheral devices (portable device 202 and security device 203) to enable the host computing device 201 to exchange secured data with the portable device 202. For several reasons, this may be inconvenient. First, both devices 202 and 203 may not be available at the time that it is desired to perform a secure data exchange (e.g., one may have been forgotten or misplaced). Second, even if both devices 202 and 203 are available, it may not be possible to connect both devices 202 and 203 at the same time to the host computing device 201, making use of the devices 202 and 203 cumbersome and increasing the likelihood that unsecured data is provided by the host computing device 201 to the portable device 202.

SUMMARY OF THE INVENTION

A modular device according to the invention can be used to communicate with a host computing device to enable one or more security operations to be performed by the modular device on data stored within the host computing device, data provided from the host computing device to the modular device (which can then be, for example, stored in the modular device or transmitted to yet another device), or data retrieved by the host computing device from the modular device (e.g., data that has been stored in the modular device, transmitted to the modular device from another device or input to the modular device by a person). In particular, the modular device can include a security module that is adapted to enable performance of one or more security operations on data, and a target module that is adapted to enable a defined interaction with a host computing device. The target module can be embodied by any of a variety of modules having different types of functionality (e.g., data storage, data communication, data input and output, user identification), as described further below. The modular device can be implemented so that the modular device can be operated in any one of multiple user-selectable modes: a security functionality only mode, a target functionality only mode, and a combined security and target functionality mode. The modular device can also be implemented so that the security operations are performed in-line, i.e., the security operations are performed between the interface of the host computing device to the modular device and the external communications interface of the target module. Moreover, the modular device can be implemented so that the security functionality of the modular device is transparent to the host computing device.

A modular device according to the invention can advantageously enable application of security operations to a wide variety of interactions with a host computing device. In particular, a modular device according to the invention can accomplish this without necessity to use multiple peripheral devices that each include security functionality in addition to the primary functionality of the peripheral device. This can, for example, facilitate use of peripheral devices having security capability that operate in a predictable, reliable and consistent (yet secure) manner, since a single security module can be used to provide security to multiple types of interaction with a host computing device. This can also enable ease and flexibility in use of secure peripheral devices, since the same security module can be used with a variety of target modules. Moreover, the provision of in-line security in a modular device according to the invention enables a more secure exchange of data between a host computing device and the modular device, overcoming the problems identified above in previous systems for performing security operations on data exchanged between such devices. Additionally, implementing a modular device according to the invention so that the performance of security operations by the modular device is transparent can reduce or eliminate the need to modify aspects of the operation of the host computing device (e.g., device drivers of the host computing device), making implementation and use of a data security system including the modular device simpler and easier. Thus, the possibility that a user will use the system incorrectly (e.g., fail to apply security operations to an interaction with the host computing device, or apply the security operations incorrectly or incompletely) is reduced. Making the security operations transparent can also enhance the security of those operations.

In one embodiment of the invention, a modular device that is adapted to enable communication with a host computing device includes a security module and a target module that are constructed so that the modules can physically engage with one another, as well as communicate with each other. The target module is adapted to enable a defined interaction with a host computing device (examples of which are given below). The security module is adapted to enable performance of one or more security operations on data. The target module can be embodied, for example, as a memory module adapted to enable non-volatile storage of data (e.g., a module including a solid-state disk storage device such as a compact flash memory device), a communications module adapted to enable communication between the host computing device and a remote device (e.g., a modem module or a LAN transceiver module), a biometric module (e.g., a fingerprint scanning module, a retinal scanning module, a faceprint scanning module), or a smart card reader module adapted to communicate with a smart card. In a further particular embodiment of the modular device, the security module is adapted to enable communication with a host computing device. In another further particular embodiment, the modular device is further adapted to enable provision of the type of a target module to a host computing device in response to a request from the host computing device for information regarding the type of the modular device.

In another embodiment of the invention, a modular device includes a security module that is adapted to enable performance of one or more security operations on data, and a target module that is adapted to enable a defined interaction with a host computing device (such as the interactions discussed above with respect to exemplary embodiments of the target module of the previously discussed embodiment of the invention). The security and target modules are adapted so that the modules can communicate with each other. However, only the security module is enabled to communicate directly with the host computing device. In a further particular embodiment of the modular device, the security module is further adapted to enable provision of the type of a target module to a host computing device in response to a request from the host computing device for information regarding the type of the modular device.

In yet another embodiment of the invention, a modular device that is adapted to enable communication with a host computing device, and that includes a security module that is adapted to enable performance of one or more security operations on data and a target module that is adapted to enable a defined interaction with a host computing device, is further adapted to enable provision of the type of a target module to a host computing device in response to a request from the host computing device for information regarding the type of the modular device. As with the previously discussed embodiments of the invention, the target module can be embodied by any of a variety of modules.

In still another embodiment of the invention, a modular device that is adapted to enable communication with a host computing device, and that includes a security module that is adapted to enable performance of one or more security operations on data and a target module that is adapted to enable a defined interaction with a host computing device, is further adapted to enable the security module and/or the target module to be operably connected to the host computing device in response to an instruction from the host computing device. As with the previously discussed embodiments of the invention, the target module can be embodied by any of a variety of modules.

In another embodiment of the invention, a security module is adapted to enable communication with a host computing device, performance of one or more security operations on data, and communication with a target module that is adapted to enable a defined interaction with a host computing device. The security module can also be adapted to enable physical engagement with the target module. Additionally, the security module can be adapted to enable communication with a target module to obtain information from the target module that can be used to identify the type of the target module. Such a security module can further be adapted to enable provision of the information to a host computing device in response to a request from the host computing device for information regarding the type of the device of which the security module is part.

In yet another embodiment of the invention, a data security system includes a host computing device and a modular device including a security module. The host computing device and the security module are adapted to enable communications with each other. The security module is also adapted to enable performance of one or more security operations on data, and communication with a target module that is adapted to enable a defined interaction with a host computing device. In a further particular embodiment of the system, the modular device further includes a target module which is adapted to enable communication with a security module, as well as to enable a defined interaction with a host computing device (examples of which are discussed above with respect to exemplary embodiments of the target module of previously discussed embodiments of the invention). In another further particular embodiment of the system, the security module is further adapted to enable communication with a target module to obtain information from the target module that can be used to identify the type of the target module, and subsequent provision of the information to a host computing device in response to a request from the host computing device for information regarding the type of the modular device.

In still another embodiment of the invention, a method for use in a modular device adapted for communication with a host computing device, the modular device including a security module and a target module, includes the steps of receiving a request from the host computing device for information regarding the type of the modular device, and providing the type of the target module to the host computing device in response to the request. In a further particular embodiment of the method, the method includes the step of controlling the security module to communicate with the target module so as to obtain information from the target module that can be used to identify the type of the target module. This last step can be particularly advantageous when used with a modular device in which only the security module can communicate directly with the host computing device, since the method allows the presence of the security module to be masked from the host computing device.

DETAILED DESCRIPTION OF THE INVENTION

Figure 1:
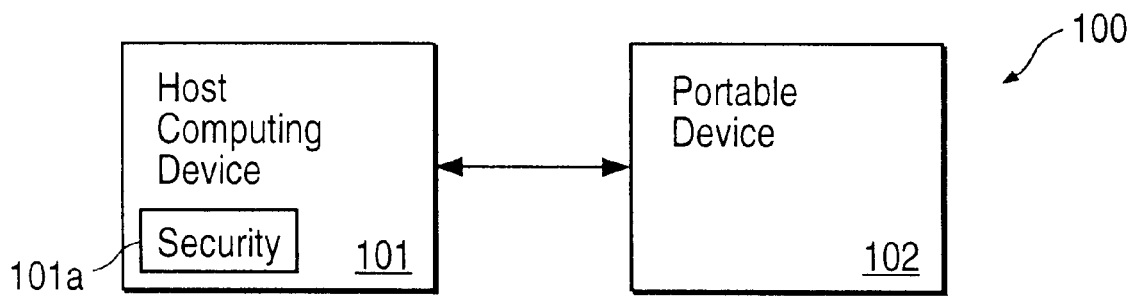
FIG. 1 is a block diagram of a prior art system for enabling a host computing device to provide secured data to, and retrieve secured data from, a portable device.
Figure 2:
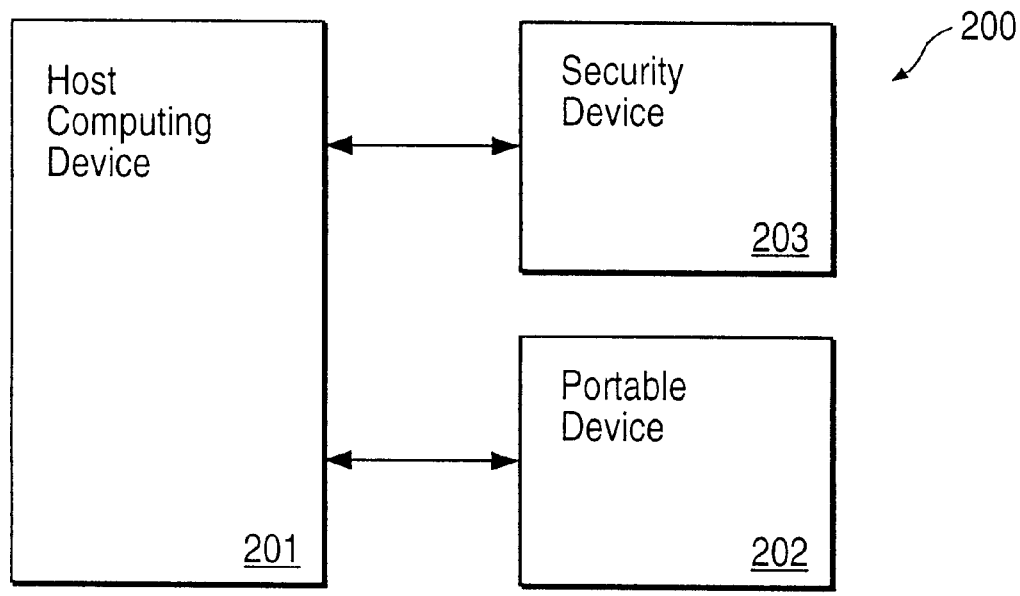
FIG. 2 is a block diagram of another prior art system for enabling a host computing device to provide secured data to, and retrieve secured data from, a portable device.
Figure 3A:
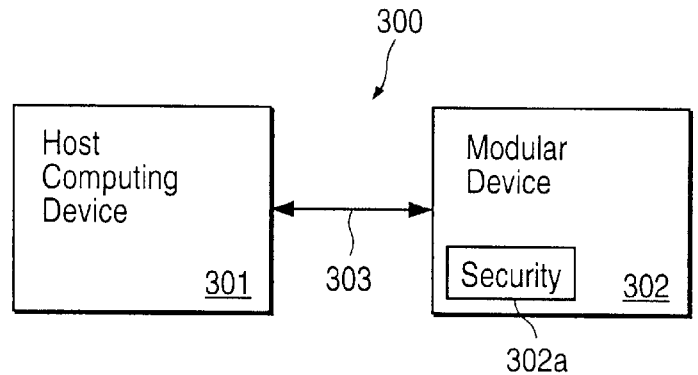
FIG. 3A is a block diagram of a system according to the invention.

FIG. 3A is a block diagram of a system 300 according to the invention. The system 300 includes a host computing device 301 and a modular device 302 that communicate via a communications interface 303. The modular device 302 includes at least a security module 302a that enables security operations (examples of which are described in more detail below) to be performed on data that is stored within the host computing device 301, data that is transmitted from the host computing device 301 to the modular device 302, or data that is transmitted from the modular device 302 to the host computing device 301. As explained in more detail below, such a modular device can also include a target module for providing additional functionality to a system according to the invention, such as, for example, a memory module (e.g., a module including a compact flash memory device), a communications module (e.g., a module including a modem or a LAN transceiver), a biometric module (e.g., a module including a fingerprint scanning device, a retinal scanning device, or a faceprint scanning device) or a smart card reader module.

Generally, the communications interface 303 can be any embodied by any of a variety of communication interfaces, such as a wireless communications interface, a PCMCIA interface, a smart card interface, a CD-ROM interface, a serial such as an RS-232 interface, a parallel interface, or a SCSI interface. Each embodiment of the communications interface 303 includes hardware present in each of the host computing device 301 and modular device 302 that operates in accordance with a communications protocol (which can be embodied, for example, by software stored in a memory device and/or firmware that is present in the host computing device 301 and/or modular device 302) appropriate for that type of communications interface, as known to those skilled in the art. Each embodiment of the communications interface 303 also includes mechanisms to enable physical engagement, if any, between the host computing device 301 and modular device 302.

Generally, the security module 302a can be configured to perform any electronic data security operation (herein, referred to simply as a "security operation") including, for example, operations that provide one or more of the basic cryptographic functions, such as maintenance of data confidentiality, verification of data integrity, user authentication and user non-repudiation. Particular security operations that can be implemented in a modular device according to the invention are described in more detail below.

The security module 302a can be, for example, a security token. Herein, "security token" refers to a device that performs security operations and that includes one or more mechanisms (such as, for example, use of a hardware random number generator and/or protected memory) to provide security for the content of those operations.

Figure 3B:
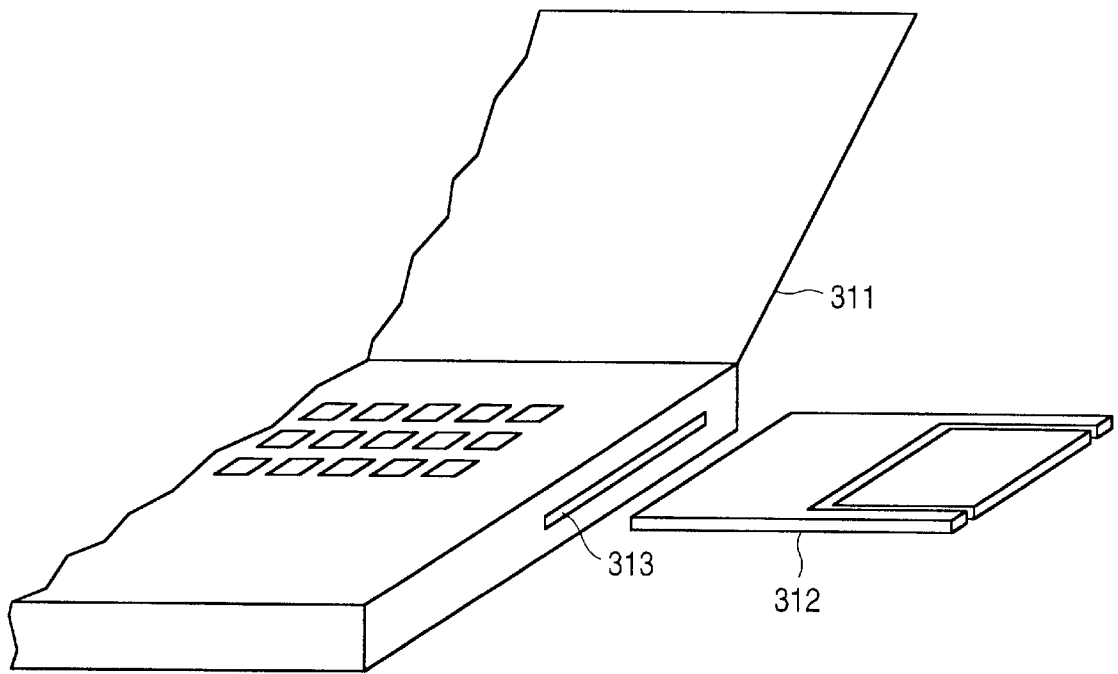
FIG. 3B is a perspective view of a physical implementation of the system of FIG. 3A, according to one embodiment of the invention.

FIG. 3B is a perspective view of a physical implementation of the system 300 of FIG. 3A, according to one embodiment of the invention. In FIG. 3B, the modular device 302 is embodied as a card 312 that can be inserted into a corresponding slot 313 formed in a portable computer 311 that, in FIG. 3B, embodies the host computing device 301.

Figure 4A:
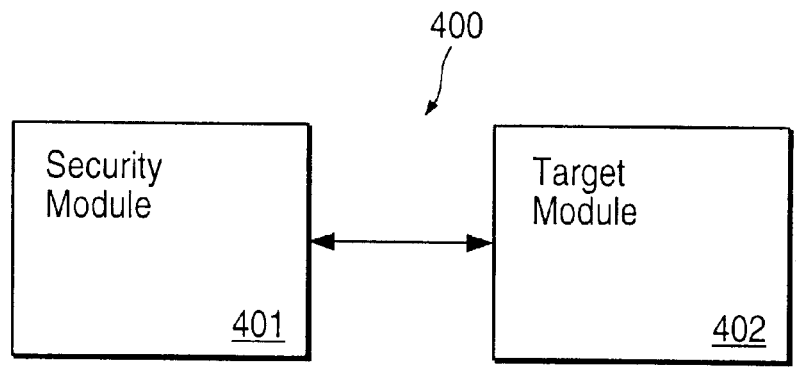
FIG. 4A is a block diagram of a modular device, according to one embodiment of the invention, including a security module and a target module that, together, can embody the modular device of the system of FIG. 3A.

FIG. 4A is a block diagram of a modular device 400, according to one embodiment of the invention, including a security module 401 and a target module 402 that, together, can embody the modular device 302 of the system 300 of FIG. 3A. (Note, though, that it is possible, as explained in more detail below, to use the modular device 400 with only the security module 401.) The security module 401 and target module 402 are physically separate devices that can be physically and electrically joined (as described further below) to enable communication between the modules 401 and 402.

The modular device 400 can have a number of advantageous characteristics. The modular device 400 can be implemented in a manner that enables the security operations to be performed in a manner that is transparent to a host computing device (and, depending upon the particular implementation of the modular device 400, to a user of a system including the modular device 400) of a system according to the invention, so that the host computing device (and, perhaps, user) is aware only of the presence of the functionality associated with the target module 402. Additionally, the modular device 400 can be implemented so that security operations are performed "in-line," i.e., the security operations are performed between the interface of the host computing device to the modular device 400 and the external communications interface of the target module 402. Further, the modular device 400 enables a wide variety of secure target module functionality to be easily provided to a host computing device.

Figure 4B:
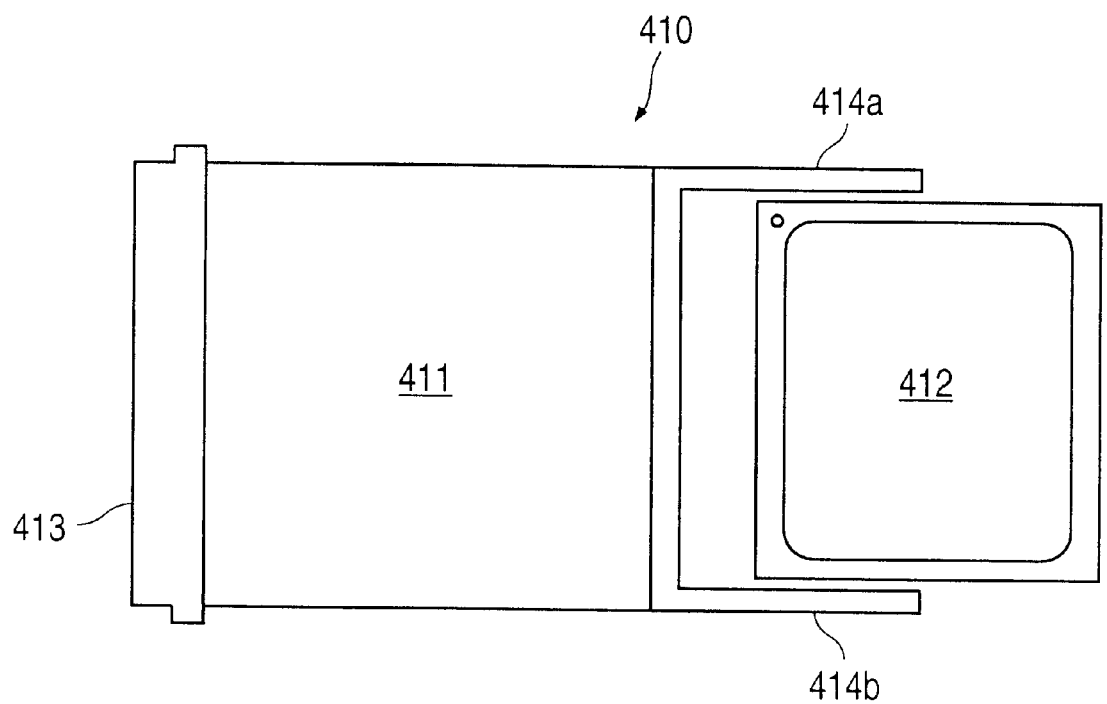
FIG. 4B is a plan view of a modular device that represents a physical implementation, according to one embodiment of the invention, of the modular device of FIG. 4A.

FIG. 4B is a plan view of a modular device 410 that represents a physical implementation, according to one embodiment of the invention, of the modular device 400 of FIG. 4A. The modular device 410 includes a first module 411 and a second module 412. A connector 413 is formed at one end of the first module 411. Opposite the connector 413, two opposing arms 414a and 414b extend from the first module 411, forming a recess therebetween. The second module 412 has a size such that the second module 412 can fit into the recess between the arms 414a and 414b of the first module. When the second module 411 is inserted into the recess of the first module 410, the modules 410 and 411 can be physically engaged with, or attached to, each other. Such engagement or attachment can be accomplished in any appropriate manner. For example, a friction fit between corresponding pins and sockets formed on the modules 410 and 411 can be used to hold the modules 410 and 411 in place with respect to each other (the pins and sockets can also enable electrical communication between the modules). The modular device 410 can have a size and shape such that the modular device 410 can be inserted into a Type II PCMCIA card slot, and the connector 413 can conform physically to the specification for Type II PCMCIA cards, so that the modular device 410 can be inserted into a Type II PCMCIA card slot of a host computing device to enable communication between the host computing device and the modular device 410.

In general, either of the first module 411 or second module 412 can be a security module and the other can be a target module. However, since as shown in FIG. 4B and described above, the connector 413 makes connection to the host computing device, it is preferable that the first module 411 be the security module and the second module 412 be the target module to facilitate implementation of the in-line security aspect of the invention.

Figure 5:
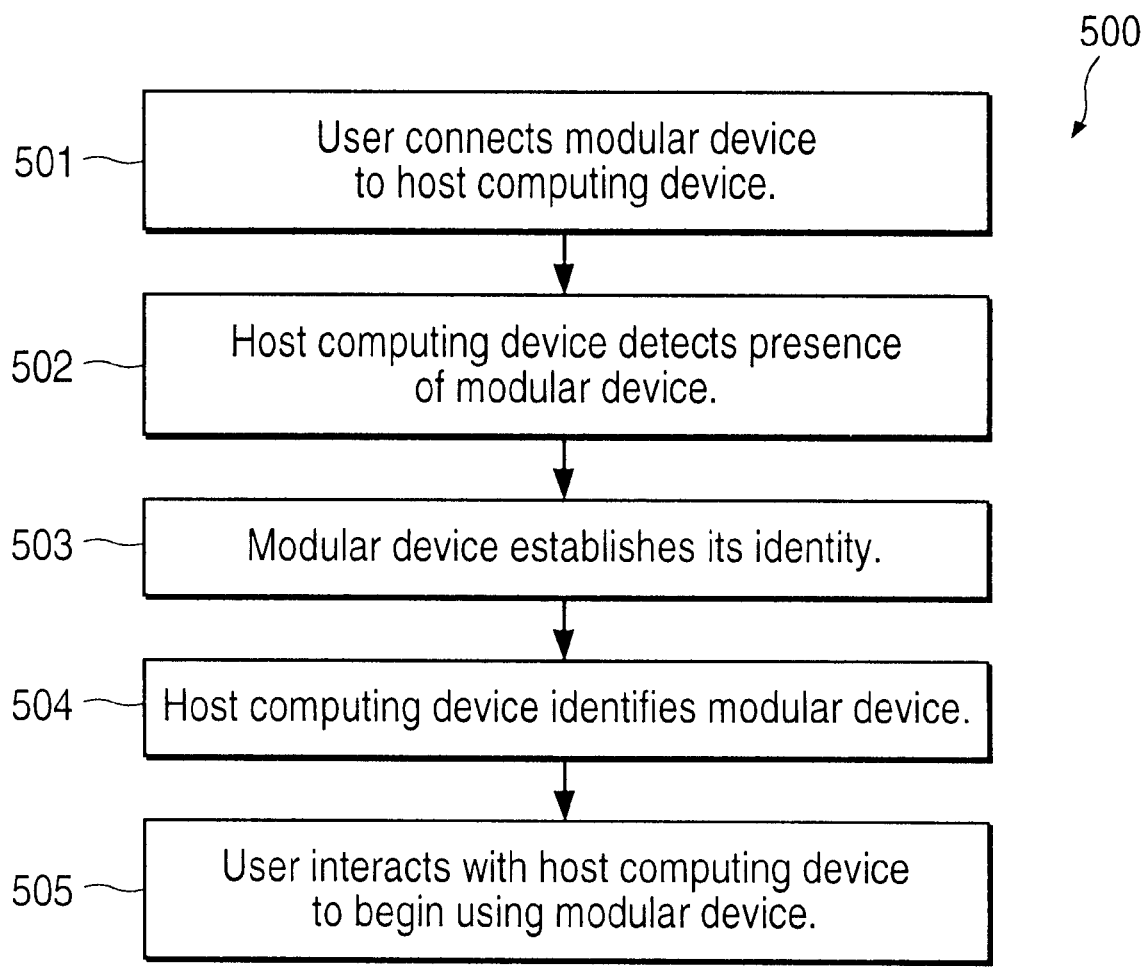
FIG. 5 is a flow chart of a method, according to an embodiment of the invention, for initiating use of a system according to the invention.

FIG. 5 is a flow chart of a method 500, according to one embodiment of the invention, for initiating use of a system according to the invention. The method 500 enables an aspect of the invention in which the presence of a security module as part of a modular device is not detected by a host computing device, thus making the security operations performed by the security module transparent to the host computing device and, depending upon the particular manner in which the security module is implemented, to a user of the system.

Figure 6:
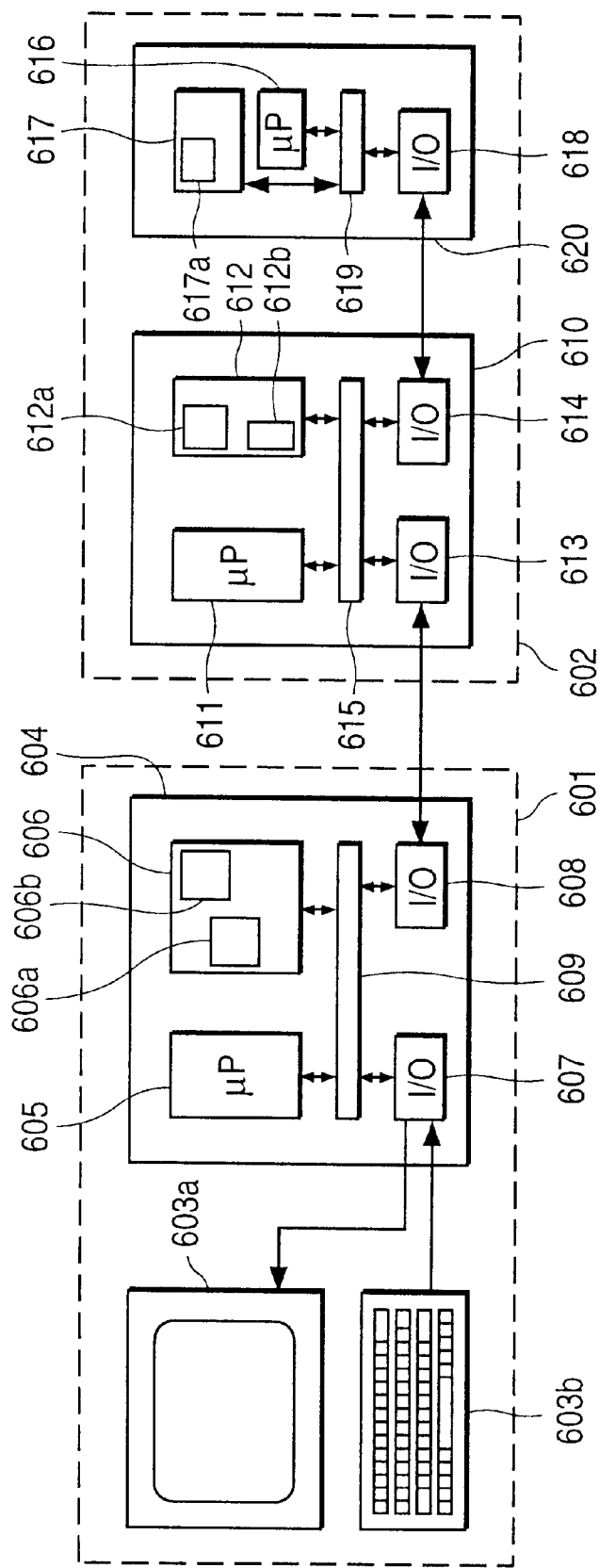
FIG. 6 is a block diagram of a system, according to an embodiment of the invention, illustrating operation of the system during a method according to the invention as in FIG. 5.

FIG. 6 is a block diagram of a system 600, according to an embodiment of the invention, illustrating operation of the system 600 during a method according to the invention such as the method 500 of FIG. 5. The system 600 includes a host computing device 601 and a modular device 602. The modular device 602 includes a security module 610 and a target module 620. The host computing device 601 includes a display device 603a (e.g., a conventional computer display monitor) and user input device 603b (e.g., a keyboard, mouse, trackball, joystick or other appropriate device), referred to collectively hereinafter as user interface device 603. The host computing device 601 also includes, mounted within a housing 604, a processing device 605, a memory device 606, an input/output (I/O) device 607 for enabling communication with the user interface device 603, and an input/output (I/O) device 608 for enabling communication with modular device 602. The devices 605, 606, 607 and 608 can each be implemented by conventional such devices and can communicate with each other via a conventional computer bus 609, as is well known and understood. The security module 610 of the modular device 602 includes a processing device 611, a memory device 612, an input/output (I/O) device 613 for enabling communication with the host computing device 601, and an input/output (I/O) device 614 for enabling communication with the target module 620 of the modular device 602. The devices 611, 612, 613 and 614 can each be implemented by conventional such devices and can communicate with each other via a conventional computer bus 615, as is well known and understood. The target module 620 of the modular device 602 includes a processing device 616, a memory device 617, and an input/output (I/O) device 618 for enabling communication with the security module 610. The devices 616, 617 and 618 can each be implemented by conventional such devices and can communicate with each other via a conventional computer bus 619, as is well known and understood. The host computing device 601, and the security module 610 and target module 620 of the modular device 602 are shown in simplified form in FIG. 6 to facilitate clarity in illustration of this aspect of the invention; as described in more detail below and as understood by those skilled in the art, the host computing device 601, the security module 610 and the target module 620 can—and typically will—include other devices not shown in FIG. 6.

Returning to FIG. 5, use of a system according to the invention begins when, as shown by step 501, a user of the system connects a modular device according to the invention to a host computing device. Such connection can occur in any manner that enables the modular device to communicate with the host computing device. Frequently, this will occur as a result of a physical connection of the modular device to the host computing device. (In general, such physical connection can occur either before or after the host computing device begins operating; however, in the former case, subsequent steps of the method 500—with the exception of, depending upon the implementation of the modular device, the step 503—cannot be performed until the host computing device begins operating.) For example, the modular device can be embodied in a card or disk (e.g., a card conforming to a PCMCIA form factor as established by the appropriate standard) that is inserted into a corresponding socket formed in the host computing device. Or, the modular device can be embodied in a housing from which a cord extends, a plug of the cord being inserted into a mating receptacle formed in the host computing device. However, such physical connection need not necessarily occur; the modular device can also be connected to the host computing device by any type of wireless communication for which the host computing device contains an appropriate interface.

Once connection between the modular device and the host computing device is made, the host computing device detects the presence of the modular device, as shown by step 502. Such detection of the presence of a peripheral device is typically enabled as a standard aspect of the operating system software of the host computing device.

Typically, once the presence of a new peripheral device is detected by the operating system software of the host computing device, the operating system software (or companion software program) also identifies the type of the peripheral device. This can be accomplished, for example, by a standard software device driver (hereinafter, "host driver") for devices of the type that use the host computing device interface that is being used by the modular device 602. In FIG. 6, the host driver is shown stored in the memory section 606*a* of the memory device 606 of the host computing device 601. (The Card Services or Socket Services programs that often are bundled with the Windows95™ operating system software for use in performing various "housekeeping" functions associated with a PCMCIA interface are examples of such drivers.) However, in the method 500, before the operating system software can perform such identification, the modular device according to the invention suspends operation of this aspect of the operating system software, so that the modular device can establish its identity, as shown by step 503, and explained further below. As will be apparent from that explanation, performance of the step 503 advantageously enables the modular device to assume the identity of the target module that is part of the modular device at that time. Since, as described elsewhere herein, a variety of types of target modules can be used as part of a modular device according to the invention, the modular device can take a variety of identities.

The particular manner in which operation of the operating system software is suspended so that the modular device can establish its identity can depend on the characteristics of the operating system software and/or the device interface. However, for many combinations of operating system software and device interface, the operating system software waits for confirmation that the device connected to the device interface is ready for further interaction with the operating system software before the operating system software seeks to identify the type of the device connected to the interface (the standard for PCMCIA interfaces, for example, specifies such operation). In such cases, the modular device can be configured to delay informing the operating system software that the modular device is ready for further interaction until the modular device has established its identity.

The following description of one way in which the step 503 can be implemented can best be understood by reference to the system 600 shown in FIG. 6. One way in which the operating system software of a host computing device can identify the type of a peripheral device is to access a known memory section of a memory device of the peripheral device, as established by an interface standard developed for that type of peripheral device, that stores data representing the type of the peripheral device. This is true for a variety of types of peripheral devices, such as, for example, peripheral devices that conform to the PCMCIA standard. (The PCMCIA standard, for example, includes a specification, called the Card Information Structure, that defines, among other things, a location in a portion of memory of a PCMCIA card, denoted as "attribute memory", that stores data identifying the type of the PCMCIA card.) In the system 600, the modular device 602 is such a device. Further, since the modular device 602 is configured so that the security module 610 communicates with the host computing device 601, the memory section which the host computing device 601 seeks to access is in the memory device 612 of the security module 610. This section is shown as the memory section 612*a* in FIG. 6 and the data stored therein is referred to herein as "modular device identification data."

Prior to use of the modular device 602 with the host computing device 601, the data stored in the memory section 612*a* of the security module 610 is data that identifies the type (i.e., security device) of the security module 610 ("security module identification data"). Thus, initially, the modular device 602 is identified as a security device. However, in FIG. 6 (and in many other embodiments of a modular device according to the invention as well), the modular device 602 includes a target module 620. According to the invention, and as explained in more detail below, the modular device 602 can be implemented so that the modular device 602 assumes the identity of the target module 620 rather than that of the security module 610. This enables the host computing device 601 to interact with the modular device 602 as though the modular device 602 were a device of the type of the target module 620, without recognizing that a security module 610 is present that may be performing security operations. Thus, the need to modify aspects of the operation of the host computing device (e.g., the host device driver) is reduced or eliminated, making implementation and use of a data security system including the modular device 602 simpler and easier. Since use of the data security system is easier (e.g., a user need not provide input to cause the host driver to be appropriately tailored to enable desired interaction with a security device), the possibility that a user will use the system incorrectly (e.g., fail to apply security operations to an interaction with the host computing device, or apply the security operations incorrectly or incompletely) is reduced.

When the modular device 602 is connected to the host computing device 601 (e.g., step 501 of the method 500), power is applied to the modular device 602. Upon application of power to the modular device 602, a startup program stored in the memory device 612 of the security module 610 of the modular device 602 begins to execute. This program can include instructions that cause the processing device 611 of the security module 610 to communicate via the I/O interface 614 with the target module 620 to ascertain the type of the target module 620. Each target module to be used as part of a modular device according to the invention can be implemented so that data representing the type of that target module ("target module identification data") is stored at a particular memory section in a memory device of the target module. In FIG. 6, this is shown by the memory section 617a in the memory device 617 of the target module 620. Thus, the startup program executed on the security module 610 can include instructions to cause the processing device 616 of the target module 620 to access the memory section 617a in the memory device 617, and transfer to the security module 610, via the I/O interface 618, the data representing the type of the target module 620. When the target module identification data is transferred to the security module 610, the data is stored in the memory section 612a which the host computing device operating system software will access to obtain the modular device identification data, thus resulting in identification of the modular device 602 by the host computing device 601 as a device of the type of the target module 620.

Alternatively, the same result can be achieved by modifying the host driver so that the host driver accesses a different section of the memory 612 at which data representing the type of the target module is known to be stored. However, because the former approach does not necessitate modifying the host driver, the former approach may be preferable.

Though, as shown in FIG. 6, the modular device 602 includes the security module 610 and target module 620, the system 600 can also operate when the modular device 602 includes only the security module 610, the modular device 602 being used in that case to enable security operations to be performed on data stored in the host computing device 601. In such a case, when the modular device 602 establishes its identity to be supplied to the host computing device 601 (e.g., step 503 of the method 500), such identity is established simply by retaining unchanged in the location 612a of the memory device 612 the information identifying the modular device 602 as a security device.

Before the target module identification data is stored in the memory section 612a of the memory device 612 of the security module 610, the security module identification data is moved from the memory section 612a in the memory device 612 to a different, predefined memory section 612b of the memory device 612. This enables the security module identification data to be accessed by the modular device driver (discussed below), so that the security functionality of the modular device can be used.

Returning to FIG. 5, after the modular device has established its identity, the host computing device identifies the modular device, as shown by step 504. This can be implemented as part of the host driver, as indicated above.

Once the host computing device has identified the modular device (and other host computing device operating system software operations concluded, if applicable), the user can begin using the modular device (in particular, the security functionality of the modular device), as shown by step 505 of the method 500. Such use can be enabled by one or more software programs (referred to collectively hereinafter as a "modular device driver," though such programs can include programs in addition to those conventionally termed "drivers," such as programs conventionally termed "applications") that are executed by the host computing device.

The use of a separate driver to control and interact with the security functionality of a modular device according to the invention can be advantageous because it reduces or eliminates the need to modify the host driver. As a practical matter, such modification of the host driver can likely only be accomplished by requiring a user to interact with a standard host driver to appropriately modify the standard host driver. This is undesirable because the user may forget to modify the driver or modify the driver incorrectly or incompletely.

The modular device driver can have previously been installed on a data storage device (e.g., hard disk) of the host computing device (in FIG. 6, the modular device driver is shown stored in the memory section 606b of the memory device 606 of the host computing device 601), or can be made accessible to the host computing device via an appropriate interface (such as a floppy disk drive, CD-ROM drive or network connection) at a time when the user wishes to initiate interaction between the host computing device and the modular device. Additionally, when a modular device according to the invention is used with a host computing device which utilizes operating system software that supports the feature informally referred to as "plug and play", it is also possible to store the modular device driver in a memory device of the modular device and configure the modular device so that, when the modular device is connected for the first time to a particular host computing device, the host computing device automatically provides the user with the opportunity to instruct the host computing device to cause the modular device driver to be transferred from the modular device to the host computing device.

Figures 7, 7A:
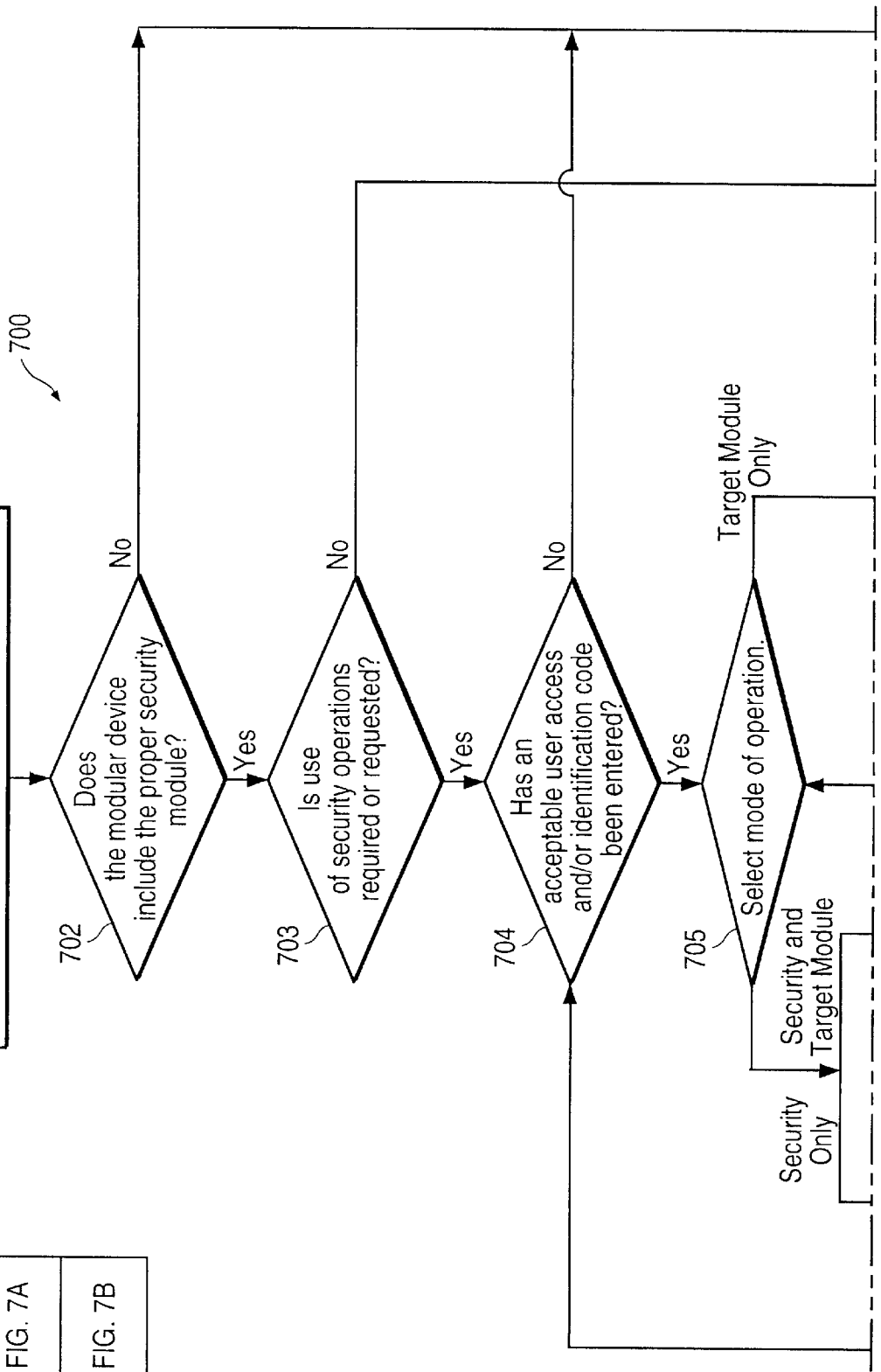
FIG. 7 is a flow chart of a method, according to an embodiment of the invention, for using a modular device according to the invention.
Figure 7B:
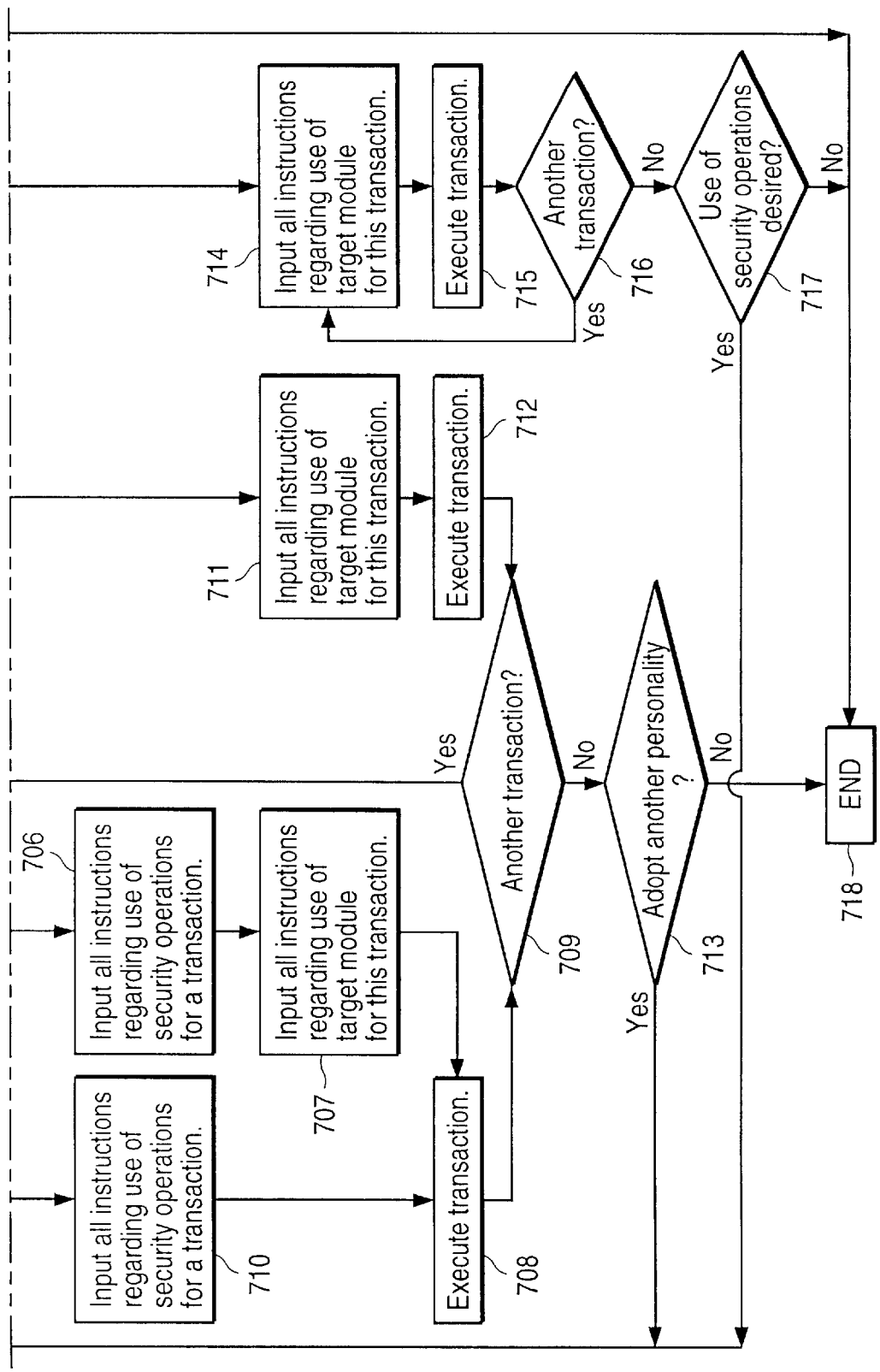

FIG. 7 is a flow chart of a method 700, according to an embodiment of the invention, for using a modular device according to the invention. It is to be understood that the method 700 shown in FIG. 7 is not the only way to enable the aspects of use of a modular device according to the invention that are illustrated in FIG. 7; as can be readily appreciated by those skilled in the art, such aspects can be implemented using any of a variety of other appropriate methods. Further, the use of a modular device according to the invention can include aspects not illustrated in FIG. 7; likewise, such use may not include some of the aspects illustrated in FIG. 7. The method 700 of FIG. 7 is shown merely to aid in the illustration of certain aspects of the invention, and should not be interpreted as restricting the manner in which a modular device according to the invention can be used.

To begin using a modular device according to the invention, a user instructs the host computing device to begin execution of the modular device driver, as shown by step 701 of the method 700, the user having obtained knowledge of the appropriate command to begin execution of the modular device driver in any appropriate manner (e.g., from a user manual accompanying the modular device driver and/or the modular device). In general, the steps of the method 700 occur as a result of operation of a modular device driver; however, operation of the host driver may be necessary or desirable to enable some aspects of the method 700 (e.g., execution of a transaction, as in steps 708, 712 and 715).

As indicated above, a modular device according to the invention can be implemented so that, when a target module is present as part of the modular device, the host driver cannot detect the presence of the security functionality of the modular device. In such case, the modular device driver enables the detection of the security functionality, as shown by step 702 of the method 700. This can be accomplished by including instructions as part of the modular device driver that, when the modular device driver first begins executing, cause the modular device driver to access a predefined location of a memory device of the modular device (preferably, and as described above, a memory device of a security module of the modular device) for data that identifies whether the modular device is a device having security functionality that is compatible with the modular device driver. (In FIG. 6, this is shown as the memory section 612b.) If the modular device is such a device, then the modular device driver can enable the user to make use of the security functionality of the modular device. Further, the modular device driver can be implemented, as shown in FIG. 7, so that, if the proper security functionality is not detected, execution of the modular device driver terminates, preventing use of the modular device. Alternatively, the modular device driver can be implemented so that, if the proper security functionality is not detected, the functionality of a target module of the modular device can be used without the security functionality of the modular device.

A modular device according to the invention that includes a security module and a target module can, in general, be operated in one of three modes: 1) a mode in which only the functionality of the security module is used, 2) a mode in which the functionality of both the security and the target modules is used, and 3) a mode in which only the functionality of the target module is used. The user can be enabled to, via the modular device driver, select any one of the three modes of operation. However, in some applications, it may be desirable to inhibit operation in one or two of the modes. In particular, it may be desirable to prevent operation of the modular device in the last of the above-listed modes, i.e., a mode in which the security module is not used, if it is desired to ensure that use of the target module can only occur with the application of one or more security operations. This could be accomplished by implementing the modular device driver so that the option to operate in that mode is not presented to the user, or the modular device could be configured during manufacture to prohibit operation in that mode. For example, if the target module is a communications module or a memory module, it may be desirable to ensure that unencrypted data cannot be transferred via the communications module or stored on the memory module, whether done inadvertently or on purpose.

In the method 700, all three of the above-listed modes are available for use. In the step 703 of the method 700, a determination is made as to whether the security module is to be used. (As noted above, such use may be required.) If yes, the modular device is operated in one of the first two modes above (security functionality only, or security functionality plus target functionality); if no, the third mode is used (target functionality only).

The modular device driver can be implemented so that the user must successfully enter an acceptable access code (e.g., a password or PIN) before the user is enabled to use the modular device. In particular, it can be desirable to require an access code before enabling a user to use the security functionality, thus establishing a layer of security that protects the integrity of the security operations themselves. In the method 700, as shown by the step 704, an acceptable access code must be entered by the user before the security functionality of the modular device can be used. An access code can be entered, for example, by inputting the access code in a conventional manner using a user interface device (e.g., keyboard) of the host computing device. Or, an access code can be entered using a target module (such as a biometric module, discussed in more detail below) that is part of the modular device according to the invention.

Advantageously, an access code can be used not only to control access to the security (or other) functionality of the modular device, but also to identify a "personality" of the user. Each personality is represented by data that establishes certain characteristics of operation of the modular device, such as, for example, restrictions on operation of the modular device (e.g., limitations on the types of security operations that can be performed) or specification of operating parameters or characteristics (e.g., cryptographic keys or specification of a particular incarnation of a type of security algorithm, such as a particular encryption algorithm). A single user can have multiple personalities: each personality might, for example, correspond to a different capacity in which a user acts. Data representing personalities and corresponding user access codes can be stored in a memory device of the security module of the modular device.

Upon receipt of an acceptable access code, the modular device driver controls the host computing device to present a user interface that enables the user to effect desired control of the modular device, and, in particular, to use the modular device to perform security operations, as described below. (If access codes are also used to identify personalities, upon receipt of an acceptable access code, the modular device driver can also access and retrieve the data representing the corresponding personality, so that the operation of the modular device can be controlled accordingly.) The user interface for enabling a user to operate the modular device can be implemented in any of a variety of well known ways (e.g., as a graphical user interface) using methods and apparatus that are well known to those skilled in the art. Generally, the user interface enables the user to perform any functionality that is provided by the modular device, as described in more detail elsewhere herein.

As indicated above, a modular device according to the invention can be operated in any of three modes. Once an acceptable access code has been entered, the modular device driver can enable the user to select one of the three modes, as shown in step 705 of the method 700. (Alternatively, as mentioned above, it may be desirable to present the user only with the option of choosing the security functionality only mode or the security functionality plus target functionality mode, so as to eliminate the possibility that the user will effect an unsecured use of the target module.) If the security functionality only mode, or the security functionality plus target functionality mode, is selected, then the user interface (and the underlying modular device driver) enables the user to input all desired or required instructions regarding the security operations to be performed for a particular "transaction" (e.g., a storage of data in a memory module, a transmission of data by a communications module, or an exchange of data with a smart card reader module), as shown by steps 706 and 710 of the method 700. For example, the user interface can enable the user to select data to which security operations are to be performed, specify the application of particular security operations to data, or specify parameters or other information required for a particular security operation. If the security functionality plus target functionality mode, or the target functionality only mode, is selected, then the user interface and modular device driver enable the user to input all desired or required instructions regarding use of the target module for the transaction, as shown by steps 707 and 711 of the method 700. For example, if the target module is a memory module, the user interface can enable the user to specify a name for the stored data. Or, for example, if the target module is a communications module, the user interface can enable the user to specify a destination (e.g., an electronic mail address) for the data.

Once the user has provided instructions in steps 706 and 707, in step 710, or in step 711, the transaction is executed, as shown by step 708 or step 712 of the method 700. After execution of the transaction, the user can be allowed to execute further transactions, as shown by step 709 of the method 700. It is also possible for the user to begin using another personality (by entering an appropriate access code), as shown by step 709 of the method 700. Eventually, use of the modular device ends, as shown by step 718 of the method 700.

As indicated above, the modular device and associated modular device driver can be implemented so that it is possible to use only the target functionality of the modular device, even without entering an appropriate access code. In the method 700, such operation is shown by the steps 714, 715 and 716, which function in the same manner as steps 711, 712 and 709, described above. Using the modular device in this way can be useful, for example, when the target module is a biometric module, as described further below, that is used to perform user authentication. In particular, if the biometric module is to be used as the mechanism to enter the access code in step 704, operation in this mode may be necessary (depending on the capabilities of the biometric module) to enable such use of the biometric module. (Of course, in this case, security functionality, i.e., user authentication, is used as part of the step 715). The step 717 can also enable use of the security functionality to begin by causing a prompt for an appropriate access code to appear (step 704). Again, eventually, use of the modular device ends (step 718).

As described above, a modular device according to the invention that includes a security module and target module can be implemented so that the host computing device is not aware of the presence of the security module. It may also be desirable to shield the user from knowledge of the presence of the security module and cause predetermined security operations to be performed automatically. This may be desirable so that, for example, it is not necessary for the user to provide input regarding the performance of security operations, thus eliminating the possibility that the user will neglect to provide such input, or will provide the input incorrectly or incompletely. Or, it may be desirable to make security operations transparent to users to enhance the security of those operations, since, if the performance of such operations is unknown, there will be no attempt to defeat the security provided by those operations. If such is the case, the modular device driver can be implemented so that the modular device can operate only in the security functionality plus target functionality mode (steps 710, 711, 712, 714, 715, 716 and 717 of the method 700 cannot be performed) and so that no indication (e.g., presentation of a user interface display that allows input of instructions regarding the performance of security operations, as in step 706 of the method 700) is given of the presence of the security functionality of the modular device. Rather, the user would simply be presented with options regarding operation of the target module (step 707 of the method 700). In such an implementation, the modular device driver can be implemented to automatically cause one or more predetermined security operations to be performed based upon a user-specified interaction with the target module, or the modular device can be configured to cause such security operations to be performed any time a specified interaction with the target module occurs.

A significant advantage of a modular device according to the invention is that the modular device can be implemented so that any of a variety of types of target modules can be included as part of the modular device. In particular, as described in more detail below, the security module includes an interface control device which enables and manages communications between and among the host computing device, a cryptographic processing device that is part of the security module, and a target module. The interface control device, together with a target module I/O interface, provides a uniform interface with which each target module communicates. Thus, in general, a target module having any desired functionality can be used with a modular device according to the invention, so long as the target module is implemented so as to enable communication with an interface of the type presented by the security module. Those skilled in the art of data communications can readily understand how to implement such communication in a target module in view of the detailed description below (see FIGS. 8, 9A and 9B) of an embodiment of a security module according to the invention, and, in particular, an interface control device of such a security module.

For example, a target module of a modular device according to the invention can be embodied as a memory module adapted to enable non-volatile storage of data. In general, any such memory module can be used as a target module. More particularly, a memory module including a solid-state disk storage device (e.g., NAND flash memory device) can advantageously be used. Illustratively, a memory module that can be used as a target module in a modular device according to the invention can include a compact flash memory device, such as an ATA format flash disk drive. Other solid-state disk storage devices, such as SCSI disks and IDE disks can be used. The construction and operation of memory devices in general, as well as those identified particularly above, is well understood by those skilled in that art, so that, together with an understanding of the required communication capability between the target module and the security module, a memory module for use with the invention can be easily constructed and operated. A modular device according to the invention that includes a memory module as a target module can be used, for example, to securely store data in a manner that enables a user of the data to easily carry the data with them wherever they go.

A target module of a modular device according to the invention can also be embodied as a communications module adapted to enable communication between the host computing device and a remote device. In general, any such communications module can be used as a target module. A communications module that can be used as a target module in a modular device according to the invention can include, for example, a data communications modem (such as, for example, a conventional telephone line modem, ISDN modem, a cable modem, or a wireless modem) or a LAN transceiver (either wired or wireless and, in the latter case, operating in, for example, the infrared or radiofrequency spectrum). The construction and operation of communication devices in general, as well as those identified particularly above, is well understood by those skilled in that art, so that, together with an understanding of the required communication capability between the target module and the security module, a communication module for use with the invention can be easily constructed and operated. A modular device according to the invention that includes a communications module as a target module can be used, for example, to encrypt electronic mail before transmission to an addressee. Or, such a modular device can be used, for example, to encrypt data files that a person wishes to securely transfer between a computing device at the person's place of work and a computing device at the person's home.

A target module of a modular device according to the invention can also be embodied as a biometric module, which is defined herein as any module that is adapted to receive input data regarding a physical characteristic of a person based upon a physical interaction of the person with the module. In general, any such biometric module can be used as a target module. Biometric modules that can be used in a modular device according to the invention can include, for example, a fingerprint scanning device, a retinal scanning device or a faceprint scanning device.

In addition to conventional computational devices for storing and/or manipulating digital data, a biometric module includes a sensor for sensing the physical characteristic, and an analog-to-digital converter to transform the analog data representing the sensed characteristic into digital data. For example, a fingerprint scanning module includes a sensor upon which a person can place a finger, the sensor sensing the fingerprint of the finger, the content of the sensed fingerprint being converted into digital data by the module. Similarly, a retinal scanning module includes a sensor which can be placed proximate to a person's eye, the sensor sensing characteristics of the eye such as blood vessel pattern or iris pattern, the module translating the content of the sensed characteristics into digital data. The construction and operation of biometric devices in general, as well as those identified particularly above, is well understood by those skilled in that art, so that, together with an understanding of the required communication capability between the target module and the security module, a biometric module for use with the invention can be easily constructed and operated. Fingerprint scanning devices and retinal scanning devices that can readily be modified for use with the invention, i.e., to communicate with a security module according to the invention, are known to those skilled in that art. For example, fingerprint scanning devices such as those available from Identix Incorporated of Sunnyvale, Calif. can be used in a fingerprint scanning module for use with the invention.

A modular device according to the invention that includes a biometric module as a target module can be used, for example, to enable user authentication to a host computing device before allowing access to particular data stored on the host computing device. Such user authentication can be accomplished by using a biometric module to obtain biometric data from a user, transmitting the user's biometric data to a security module, and comparing the biometric data to an appropriate library of biometric data representing a predetermined group of people (e.g., authorized users). The library of data can be stored in a memory device of the security module.

When a modular device including a fingerprint scanning module is embodied as a card adapted to be inserted into a slot of a host computing device, it may be useful to make the fingerprint scanning module relatively long, so that a portion of the card on which the sensor is positioned can extend from the slot of the host computing device, thereby enabling fingerprints to be scanned while the modular device is inserted in the host computing device. Similarly, for a fingerprint scanning module, retinal scanning module or faceprint scanning module, it may be desirable to form the module so that the sensor is connected to the remainder of the module via an appropriate communication line, thus providing some range of movement of the sensor while the modular device is inserted in the host computing device, thereby facilitating use of the module.

A biometric module can be used in different ways with a system according to the invention, depending upon the capabilities of the biometric module. Using known apparatus and methods, a "smart" biometric module can be implemented with the capability to detect the presence of an input to the sensor, and, upon such detection, initiate acquisition of the biometric data, transfer of the data to the security module, and performance by the security module of the appropriate data comparison. Such a biometric module can be used to perform user authentication as in step 704 of the method 700 above. Alternatively, the biometric module may be "stupid" and require that a user initiate the data acquisition and authentication process. Such a biometric module can be used to perform user authentication in a modular device that allows operation without entry of a proper access code, as in steps 714 and 715 of the method 700.

A target module of a modular device according to the invention can also be embodied as a smart card reader module adapted to communicate with a smart card such as, for example, a smart card compliant with the ISO 7816 standard. Such a module can be implemented by adapting a conventional smart card reader, the construction and operation of which is well known to those skilled in that art, to provide a communications interface that enables the smart card reader to communicate with the security module. A modular device according to the invention that includes a smart card reader module can be used to provide security features to a smart card reader, or add to existing security features of a smart card reader.

As indicated elsewhere herein, a modular device according to the invention can also be used with a host computing device when the modular device includes only a security module, such a situation capable of being detected as described above. In that case, the modular device can be used to, for example, encrypt or decrypt data stored on the host computing device by receiving the data from the host computing device, encrypting or decrypting the data as appropriate, then returning the encrypted or decrypted data to the host computing device. (It can also be possible to use only the security module, in the manner just indicated, of a modular device that includes a target module.)

It is to be understood that the examples given above are merely illustrative, not exhaustive, of the ways in which a modular device according to the invention can be used. Many more possibilities exist.

Figure 8:
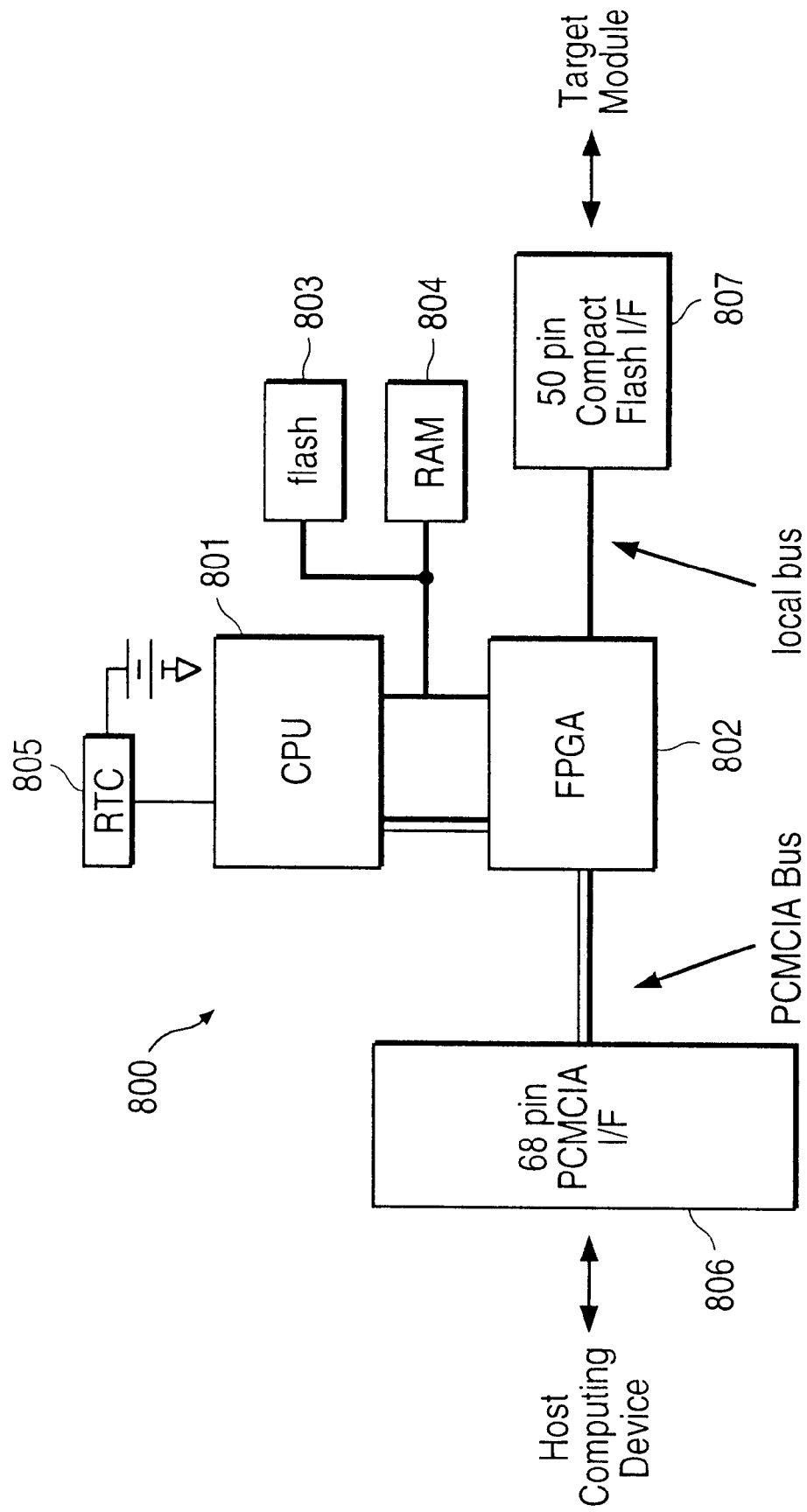
FIG. 8 is a block diagram of a security module according to one embodiment of the invention.

FIG. 8 is a block diagram of a security module 800 according to one embodiment of the invention. The security module 800 includes a cryptographic processing device 801, an interface control device 802, a first memory device 803, a second memory device 804, a real-time clock 805, a host computing device input/output (I/O) interface 806 and a target module input/output (I/O) interface 807.

The host computing device I/O interface 806 and the target module I/O interface 807 enable communications between the security module 800 and a host computing device, and security module 800 and a target module, respectively. The electrical and mechanical characteristics of the I/O interfaces 806 and 807, as well as the protocols used to enable communication via the interfaces 806 and 807, are established in any manner that conforms to the industry standard specifications for an interface of that type. For example, a modular device according to the invention can be adapted for insertion into a PCMCIA slot of a host computing device. In such a modular device, the electrical and mechanical characteristics and protocol for the host computing device I/O interface 806 are established in conformance with the appropriate PCMCIA standards. Similarly, a modular device according to the invention can include a target module that is a compact flash memory module. In such a modular device, the electrical and mechanical characteristics and protocol for the target module I/O interface 807 are established in conformance with the appropriate compact flash interface standards.

The cryptographic processing device 801 can be adapted to perform security operations. Generally, the cryptographic processing device 801 can be embodied by any processor capable of performing the cryptographic operations desired to be provided by the security module 800. In one embodiment of the security module 800, the cryptographic processing device 801 is a special purpose embedded processor, embodied on a single integrated chip and designated as MYK-82 (and also referred to by the name Capstone), which includes an ARM6™ processor core and several special purpose cryptographic processing elements that have been developed by the Department of Defense. The construction and operation of the Capstone chip is known by those skilled in the art of cryptographic processing.

The first memory device 803 can be a non-volatile data storage device which can be used to store computer programs and persistent data. The first memory device 803 can be implemented by any appropriate such device (of which there are many conventional, readily available incarnations), such as, for example, a conventional flash memory device.

The second memory device 804 can be a volatile data storage device that can also be a rapidly accessible data storage device in which frequently used data and program instructions can be stored during operation of the security module 800. The second memory device 804 can also be implemented by any appropriate such device (of which there are many conventional, readily available embodiments), such as, for example, a conventional random access memory (RAM) device.

The real-time clock 805 enables the creation of time stamps, which can be used in a number of security operations. Advantageously, the time stamps created by the real-time clock 805 are more secure than those that could otherwise be produced by the relatively insecure clock of a host computing device. The real-time clock 805 includes a conventional battery backup device that maintains power to the real-time clock 805 when the security module 800 is not in use (i.e., when power is not supplied to the security module 800), so that the correct time is continuously preserved within the security module 800. The real-time clock 805 (including battery backup) can be embodied by any conventional such device, such as the DS1302 clock available from Dallas Semiconductor of Dallas, Tex.

In the security module 800, the interface control device 802 mediates the interaction between the host computing device, the target module and the cryptographic processing device 801. In one embodiment of the security module 800, the interface control device 802 is a conventional field-programmable gate array (FPGA) that is programmed to perform the functions that it is desired to implement with the interface control device 802, as described in more detail below. The interface control device 802, under control of the cryptographic processing device 801, can be adapted to enable the modular device to assume the identity of the target module, as discussed above. The interface control device 802 also enables the in-line cryptography aspect of the invention, since the interface control device 802 controls the flow of data between the host computing device and the target module.

Figure 9A:
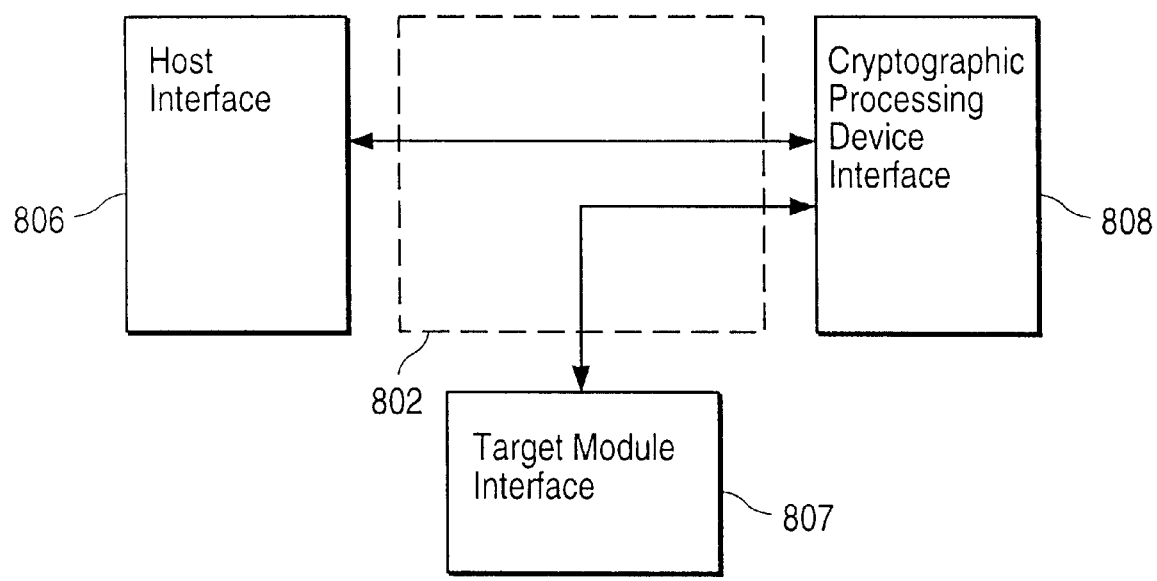
FIG. 9A is a block diagram illustrating the flow of data through the interface control device of FIG. 8.

FIG. 9A is a block diagram illustrating the flow of data through the interface control device 802 of FIG. 8. Data transferred from a host computing device enters the security module 800 (not demarcated in FIG. 9A) through the host computing device I/O interface 806. The interface control device 802 presents the data to a cryptographic processing device interface 808 (not shown in FIG. 8). Depending on the configuration of the interface control device 802, as determined by operation of the modular device driver and/or by settings established during the manufacture of the security module 800, the data may or may not be processed by the cryptographic processing device 801 (FIG. 8). Typically (or, in some cases, necessarily), as discussed in more detail above, cryptographic processing will occur. The interface control device 802 then causes the data to be transferred to the target module I/O interface 807, the data exiting the security module and being transferred to the target module. Data being transferred from the target module to the host computing device follows a similar path in the reverse direction. When the target module is not present or is not being used, data transferred from the host computing device, after being presented to the cryptographic processing device interface 808 and being processed by the cryptographic processing device 801, is caused to be transferred back to the host computing device I/O interface 806 (and, from there, to the host computing device) by the interface control device 802.

Figure 9B:
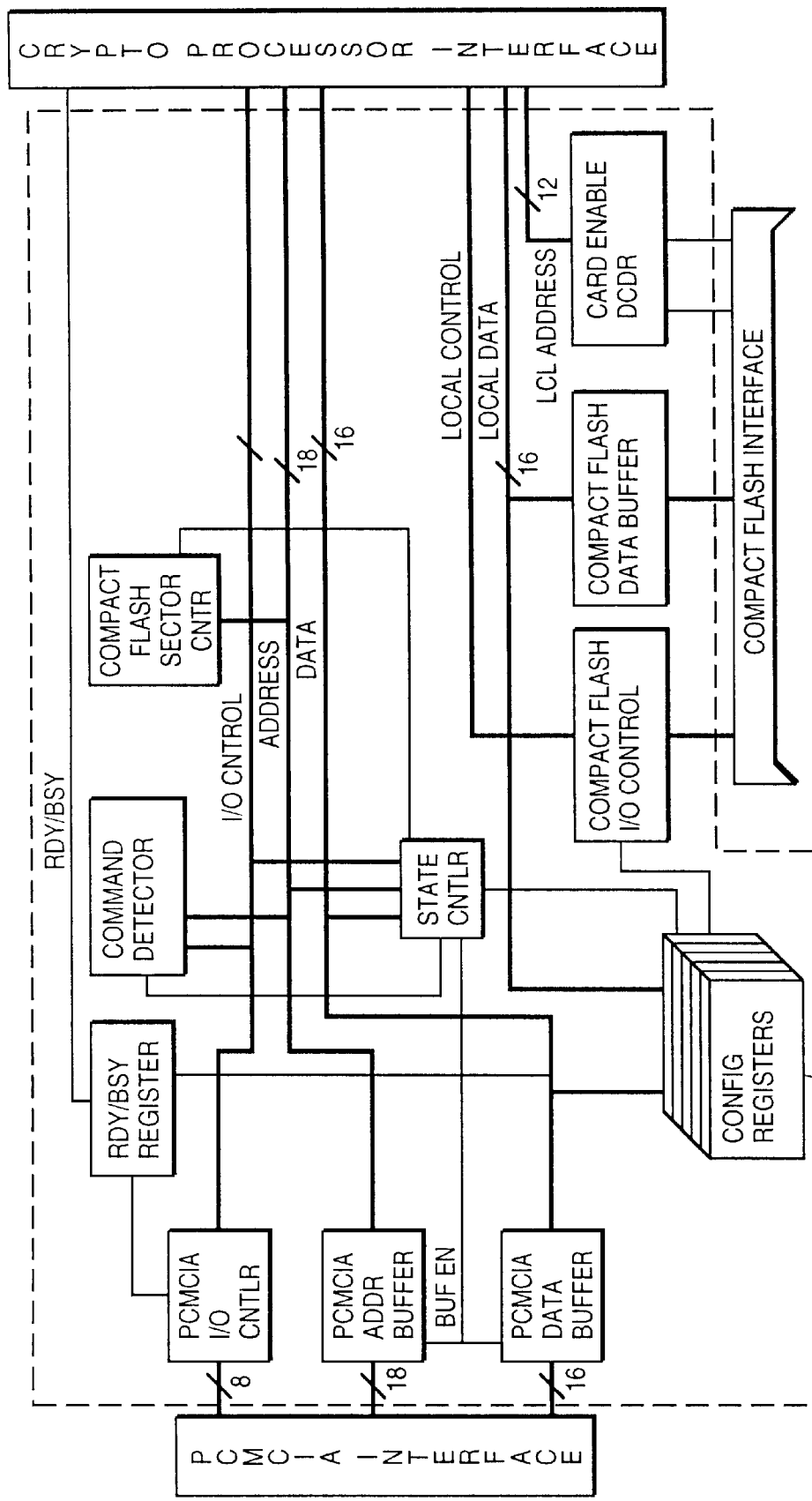
FIG. 9B is a block diagram of a particular embodiment of an interface control device for use in a security module according to the invention.

FIG. 9B is a block diagram of a particular embodiment of an interface control device 910 for use in a security module according to the invention. As shown in FIG. 9B, the host computing device communicates via a PCMCIA interface and the target module is a compact flash memory device. Those skilled in the art will readily appreciate how the interface control device 910 can be modified for use with other host computing device interfaces and/or target modules.

The interface control device 910 includes sets of configuration registers 911. The data stored in the configuration registers 911 establish operating characteristics of the interface control device: in particular, the content of the configuration registers enables the interface control device to present to the host computing device a desired identification of the modular device, and determines whether data passing through the security module must be subjected to security operations.

A set of configuration registers is maintained for the host computing device I/O interface, the cryptographic processing device interface, and the target module interface. In particular, the content of the host computing device I/O interface configuration registers is such that the interaction of the host computing device with the modular device is the same as if the security functionality were not present (unless the data security system is operating in security functionality only mode). The content of the target module interface registers reflects the presence of the security functionality. The cryptographic processing device interface registers bridge the gap between the other two sets of registers.

The remainder of the functional blocks of the interface control device 910 shown in FIG. 9B perform functions and operate in a manner that can readily be understood by those skilled in the art from the designation and interconnection of those blocks in FIG. 9B.

In general, the security mechanism (e.g., security module) of a modular device according to the invention can be configured to perform any cryptographic operation, as well as other, related mathematical operations. A configuration of the security mechanism that enables a particular cryptographic or mathematical operation can be produced, for example, by using appropriate existing cryptographic software, application-specific hardware, or combination of the two, as known by those skilled in the art of producing cryptographic devices. Following is a description of exemplary cryptographic and mathematical operations that can be implemented as part of a security mechanism of a modular device according to the invention. These cryptographic and mathematical operations are well-known and can readily be implemented in a modular device according to the invention by a person of skill in the art of cryptography.

For example, a modular device according to the invention can implement one or more cryptographic key exchange operations. Any key exchange operation can be implemented, such as, for example, the Department of Defense Standard, the RSA, the Diffie-Hellman, and the X9.42 (ANSI Banking Standard) key exchange algorithms.

A modular device according to the invention can also implement one or more hash operations. Any hash operation can be implemented, such as, for example, the FIPS 180-1 (SHA-1), the Message Digest 2 (RSA), and the Message Digest 5 (RSA) algorithms.

A modular device according to the invention can also implement one or more digital signature operations. Any digital signature operation can be implemented, such as, for example, the FIPS 186 (DSA - 512, 1024) and the RSA Signature (512, 768, 1024, 2048) algorithms.

A modular device according to the invention can also implement one or more key wrapping operations for both symmetric and asymmetric keys. A key wrapping operation can ensure that plaintext keys are not accessible external to the modular device. Any key wrapping operation can be implemented.

A modular device according to the invention can also implement one or more symmetric encryption operations. Any symmetric encryption operation can be implemented, such as, for example, the FIPS 185 (implemented completely in hardware), the DES (including 3DES, EDE3, CBC and ECB), the RC-2 and the RC-4 algorithms.

A modular device according to the invention can also implement one or more asymmetric (public key) encryption operations. While asymmetric encryption operations underlie the key exchange operations described above, asymmetric key operations can also be used independently in a modular device according to the invention for bulk encryption. Any asymmetric encryption operation can be implemented, such as, for example, the RSA and Diffie-Hellman algorithms.

A modular device according to the invention can also implement one or more exponentiation operations, which are required in many cryptographic operations. Any exponentiation operation can be implemented. Since exponentiation requires a significant amount of processing time relative to other mathematical operations, it can be desirable to implement an exponentiation operation in dedicated hardware. In one embodiment of a modular device according to the invention, the security mechanism of the modular device includes a full 1024 bit exponentiator implemented in hardware.

Various embodiments of the invention have been described. The descriptions are intended to be illustrative, not limitative. Thus, it will be apparent to one skilled in the art that certain modifications may be made to the invention as described above without departing from the scope of the claims set out below.

We claim:
1. A modular device, comprising:
   a security module, comprising:
      means for enabling one or more security operations to be performed on data;
      means for physically engaging with a target module; and
      means for communicating with a target module;
   a target module, comprising:
      means for enabling a defined interaction with a host computing device;
      means for physically engaging with a security module; and
      means for communicating with a security module;
   means for communicating with a host computing device; and
   means for operably connecting the security module and/or the target module to the host computing device in response to an instruction from the host computing device.

2. A modular device as in claim 1, wherein the target module comprises a memory module adapted to enable nonvolatile storage of data.

3. A modular device as in claim 2, wherein the memory module includes a solid-state disk storage device.

4. A modular device as in claim 1, wherein the target module comprises a communications module adapted to enable communication between the host computing device and a remote device.

5. A modular device as in claim 4, wherein the communications module comprises a modem module.

6. A modular device as in claim 4, wherein the communications module comprises a LAN transceiver module.

7. A modular device as in claim 4, wherein the communications module comprises a wireless communications module.

8. A modular device as in claim 4, wherein the communications module comprises a wired communications module.

9. A modular device as in claim 1, wherein the target module comprises a biometric module.

10. A modular device as in claim 9, wherein the biometric module comprises a fingerprint scanning module.

11. A modular device as in claim 9, wherein the biometric module comprises a retinal scanning module.

12. A modular device as in claim 1, wherein the target module comprises a smart card reader module adapted to communicate with a smart card.

13. A modular device as in claim 1, wherein the target module comprises a module including means for receiving user input data that identifies a user of the modular device.

14. A modular device as in claim 1, wherein the security module further comprises the means for communicating with a host computing device.

15. A modular device as in claim 1, further comprising means for providing the type of a target module to a host computing device in response to a request from the host computing device for information regarding the type of the modular device.

16. A modular device, comprising:
a security module, comprising:
means for enabling one or more security operations to be performed on data;
means for communicating with a target module; and
means for communicating with a host computing device;
a target module, comprising:
means for enabling a defined interaction with a host computing device; and
means for communicating with a security module; and
means for operably connecting the security module and/or the target module to the host computing device in response to an instruction from the host computing device;
wherein communication between the target module and the host computing device must first pass through the security module.

17. A modular device as in claim 16, wherein the security module further comprises means for providing the type of a target module to a host computing device in response to a request from the host computing device for information regarding the type of the modular device.

18. A modular device as in claim 16, wherein the target module comprises a memory module adapted to enable non-volatile storage of data.

19. A modular device as in claim 16, wherein the target module comprises a communications module adapted to enable communication between the host computing device and a remote device.

20. A modular device as in claim 16, wherein the target module comprises a biometric module.

21. A modular device as in claim 16, wherein the target module comprises a smart card reader module adapted to communicate with a smart card.

22. A modular device, comprising:
a security module, comprising:
means for enabling one or more security operations to be performed on data; and
means for communicating with a target module;
a target module, comprising:
means for enabling a defined interaction with a host computing device; and
means for communicating with a security module;
means for communicating with a host computing device;
means for operably connecting the security module and/or the target module to the host computing device in response to an instruction from the host computing device; and
means for providing the type of a target module to a host computing device in response to a request from the host computing device for information regarding the type of the modular device.

23. A modular device as in claim 22, wherein the target module comprises a memory module adapted to enable nonvolatile storage of data.

24. A modular device as in claim 22, wherein the target module comprises a communications module adapted to enable communication between the host computing device and a remote device.

25. A modular device as in claim 22, wherein the target module comprises a biometric module.

26. A modular device as in claim 22, wherein the target module comprises a smart card reader module adapted to communicate with a smart card.

27. A modular device, comprising:
a security module, comprising:
means for enabling one or more security operations to be performed on data; and
means for communicating with a target module;
a target module, comprising:
means for enabling a defined interaction with a host computing device; and
means for communicating with a security module;
means for communicating with a host computing device; and
means for operably connecting the security module and/or the target module to the host computing device in response to an instruction from the host computing device.

28. A modular device as in claim 27, wherein the target module comprises a memory module adapted to enable nonvolatile storage of data.

29. A modular device as in claim 27, wherein the target module comprises a communications module adapted to enable communication between the host computing device and a remote device.

30. A modular device as in claim 27, wherein the target module comprises a biometric module.

31. A modular device as in claim 27, wherein the target module comprises a smart card reader module adapted to communicate with a smart card.

32. A security module, comprising:
means for communicating with a host computing device;
means for performing one or more security operations on data;
means for communicating with a target module that is adapted to enable a defined interaction with the host computing device; and
means for operably connecting the security module and/or the target module to the host computing device in response to an instruction from the host computing device.

33. A security module as in claim 32, further comprising means for physically engaging the security module with the target module.

34. A security module as in claim 32, further comprising means for controlling the means for communicating with the target module to obtain information from the target module that can be used to identify the type of the target module.

35. A security module as in claim 34, further comprising means for providing the information to the host computing device in response to a request from the host computing device for information regarding the type of the security module.

36. A security module as in claim 32, further comprising means for mediating communication of data between the host computing device and the target module so that the communicated data must first pass through the means for performing one or more security operations on data.

37. A security module as in claim 32, further comprising means for operably connecting the security module and/or the target module to the host computing device in response to an instruction from the host computing device.

38. A data security system, comprising:
a host computing device including one or more device interfaces adapted to enable communication with another device;
a modular device, comprising a security module, comprising:
means for communicating with the host computing device;
means for performing one or more security operations on data; and
means for communicating with a target module that is adapted to enable a defined interaction with the host computing device; and
means for operably connecting the security module and/or the target module to the host computing device in response to an instruction from the host computing device.

39. A data security system as in claim 38, wherein the modular device further comprises a target module, the target module comprising:
means for communicating with the security module; and
means for enabling a defined interaction with the host computing device.

40. A data security system as in claim 39, wherein the security module further comprises:
means for controlling the means for communicating with the target module to obtain information from the target module that can be used to identify the type of the target module; and
means for providing the information to the host computing device in response to a request from the host computing device for information regarding the type of the modular device.

41. A data security system as in claim 39, wherein the target module comprises a memory module adapted to enable non-volatile storage of data.

42. A data security system as in claim 41, wherein the memory module includes a solid-state disk storage device.

43. A data security system as in claim 39, wherein the target module comprises a communications module adapted to enable communication between the host computing device and a remote device.

44. A data security system as in claim 43, wherein the communications module comprises a modem module.

45. A data security system as in claim 43, wherein the communications module comprises a LAN transceiver module.

46. A data security system as in claim 43, wherein the communications module comprises a wireless communications module.

47. A data security system as in claim 43, wherein the communications module comprises a wired communications module.

48. A data security system as in claim 39, wherein the target module comprises a biometric module.

49. A data security system as in claim 39, wherein the target module comprises a smart card reader module adapted to communicate with a smart card.

50. A data security system as in claim 39, wherein the target module comprises a module including means for receiving user input data that identifies a user of the modular device.

51. A data security system as in claim 48, wherein the biometric module comprises a fingerprint scanning module.

52. A data security system as in claim 48, wherein the biometric module comprises a retinal scanning module.

53. A data security system as in claim 38, wherein the modular device further comprises means for mediating communication of data between the host computing device and the target module so that the communicated data must first pass through the means for performing one or more security operations on data.

54. A data security system as in claim 38, wherein the modular device further comprises means for operably connecting the security module and/or the target module to the host computing device in response to an instruction from the host computing device.

55. For use in a modular device adapted for communication with a host computing device, the modular device comprising a security module that is adapted to enable one or more security operations to be performed on data and a target module that is adapted to enable a defined interaction with the host computing device, a method comprising the steps of:
receiving a request from the host computing device for information regarding the type of the modular device;
providing the type of the target module to the host computing device in response to the request; and
operably connecting the security module and/or the target module to the host computing device in response to an instruction from the host computing device.

56. A method as in claim 55, wherein the security module is adapted to enable communication with the host computing device and the target module, and the target module is adapted to enable communication with the security module and prevent direct communication with the host computing device, the method further comprising the step of controlling the security module to communicate with the target module so as to obtain information from the target module that can be used to identify the type of the target module.

57. For use in a modular device adapted for communication with a host computing device, the modular device comprising a security module that is adapted to enable one or more security operations to be performed on data and a target module that is adapted to enable a defined interaction with the host computing device, a method comprising the steps of:
communicating with the host computing device to exchange data between the host computing device and the modular device;
performing one or more security operations and the defined interaction on the exchanged data;
mediating communication of the exchanged data between the host computing device and the modular device so that the exchanged data must first pass through the security module; and
operably connecting the security module and/or the target module to the host computing device in response to an instruction from the host computing device.

58. For use in a modular device adapted for communication with a host computing device, the modular device comprising a security module that is adapted to enable one or more security operations to be performed on data and a target module that is adapted to enable a defined interaction with the host computing device, a method comprising the steps of:
receiving an instruction from a host computing device regarding operation of the modular device; and
operably connecting the security module and/or the target module to the host computing device in response to the instruction from the host computing device.

* * * * *